United States Patent
Wu et al.

(10) Patent No.: US 10,095,263 B1
(45) Date of Patent: Oct. 9, 2018

(54) APPARATUS AND METHOD FOR CALIBRATING SIGNAL SYNCHRONIZATION

(71) Applicant: Marvell International Ltd., Hamilton (BM)

(72) Inventors: Kai Wu, Singapore (SG); Yunfan Zhang, Singapore (SG)

(73) Assignee: Marvell International Ltd., Hamilton (BM)

( * ) Notice: Subject to any disclaimer, the term of this patent is extended or adjusted under 35 U.S.C. 154(b) by 120 days.

(21) Appl. No.: 15/371,783

(22) Filed: Dec. 7, 2016

Related U.S. Application Data (60) Provisional application No. 62/267,380, filed on Dec. 15, 2015.

(51) Int. Cl.
  *G06F 1/12* (2006.01)
  *G06F 1/06* (2006.01)

(52) U.S. Cl.
  CPC . *G06F 1/12* (2013.01); *G06F 1/06* (2013.01)

(58) Field of Classification Search
  CPC ..... G06F 1/12; G06F 1/14; G06F 1/10; G06F 5/06; G06F 13/1689; G06F 1/08; G06F 1/04; G06F 1/3202; G06F 9/4825; G06F 11/0757; G06F 11/3419; G11C 7/22
  See application file for complete search history.

(56) References Cited

U.S. PATENT DOCUMENTS

| | | | | |
|---|---|---|---|---|
| 5,659,719 A * | 8/1997 | Nagai | ..................... | H04J 3/047 327/153 |
| 6,473,439 B1 * | 10/2002 | Zerbe | ........................ | G06F 1/12 370/503 |
| 7,181,608 B2 * | 2/2007 | Fallon | ................... | G06F 3/0613 711/113 |
| 7,720,105 B2 * | 5/2010 | Colmant | ............... | H04L 49/153 370/389 |
| 8,508,879 B1 * | 8/2013 | Zou | ..................... | G11B 20/1024 360/51 |
| 9,013,819 B1 * | 4/2015 | Zou | .................... | G11B 5/59616 360/51 |
| 2010/0118426 A1 * | 5/2010 | Vikramaditya | ........ | B82Y 10/00 360/51 |

* cited by examiner

*Primary Examiner* — Zahid Choudhury (57) ABSTRACT

Aspects of the disclosure include a data storage controller that includes a main circuit, a synchronization circuit, and a detection circuit. The main circuit is configured to receive a test signal, generate a data signal based on the test signal, and generate a compensation signal based on the test signal and a phase shift selected from N predetermined phase shifts. N may be an integer greater than one. The synchronization circuit is configured to receive the data signal and the data compensation signal, and generate a delayed data signal and a latched compensation signal in response to the data signal. The detection circuit is configured to determine whether rising and falling edges of the latched compensation signal and corresponding rising and falling edges of the delayed data signal are synchronized.

20 Claims, 6 Drawing Sheets

APPARATUS AND METHOD FOR CALIBRATING SIGNAL SYNCHRONIZATION

INCORPORATION BY REFERENCE

This present disclosure claims the benefit of U.S. Provisional Application No. 62/267,380 "An Automatic Calibration Method for Writer Current Pre-Compensation (WCPC) between Channel SoC and Preamplifier" filed on Dec. 15, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In many applications, a data storage controller that controls recording (sometimes also referred to as "write") data on a data storage medium may apply various write-assist technologies in order to improve the speed and/or reliability of the recording process. The data storage medium may include a hard drive disc, optical drive disc, solid-state cell array, random-access memory, and the like. The write operation may include generating a write driving signal based on a write data signal for causing a magnetic field or an electric field for changing a property, phase, or configuration or a corresponding portion of the data storage medium. The write-assist technologies may include, for example, selectively increasing a driving current or voltage of the write driving signal, which is controlled by a compensation signal that has rising and falling edges synchronized with the corresponding rising and falling edges of the write data signal.

SUMMARY

Aspects of the disclosure provide a data storage controller that includes a main circuit, a synchronization circuit, and a detection circuit. The main circuit is configured to receive a test signal, generate a data signal based on the test signal, and generate a compensation signal based on the test signal and a phase shift selected from N predetermined phase shifts. N may be an integer greater than one. The synchronization circuit is configured to receive the data signal and the data compensation signal, and generate a delayed data signal and a latched compensation signal in response to the data signal. The detection circuit is configured to determine whether rising and falling edges of the latched compensation signal and corresponding rising and falling edges of the delayed data signal are synchronized.

In an embodiment, the main circuit is configured to generate N respective compensation signals for the N predetermined phase shifts. The synchronization circuit is configured to generate N respective latched compensation signals for the N predetermined phase shifts. The detection circuit is configured to determine whether rising and falling edges of the respective latched compensation signal from the synchronization circuit and corresponding rising and falling edges of the delayed data signal are synchronized for each of the N predetermined phase shifts.

The N respective compensation signals for the N predetermined phase shifts and the data signal may have a predetermined minimum width T. An $n^{th}$ phase shift $\Delta\theta_n$ of the N predetermined phase shifts can be determined based on $$\Delta\theta_n = -T + 2T \cdot \left(\frac{n-1}{N}\right).$$

The main circuit may include a phase shifter that is configured to apply the N predetermined phase shifts to the N respective compensation signals. In some examples, the main circuit is further configured to retrieve N determination results corresponding to determining whether the rising and falling edges of the N respective latched compensation signals for the N predetermined phase shifts and the corresponding rising and falling edges of the delayed data signal are synchronized, and set the phase shifter of the main circuit to apply one of the N predetermined phase shifts based on the N determination results.

In an embodiment, the detection circuit includes a first counter configured to generate a first count value corresponding to counting pulses of the delayed data signal, and a second counter configured to generate a second count value corresponding to counting pulses of the latched compensation signal during a period that the first count value is equal to or less than a predetermined threshold value.

Aspects of the disclosure provide a data storage controller that includes a synchronization circuit, a first counter, a second counter, and a calibration logic circuit. The synchronization circuit is configured to receive a data signal, receive a compensation signal, generate a delayed data signal, and generate a latched compensation signal in response to the data signal. The first counter is configured to generate a first count value corresponding to counting pulses of the delayed data signal. The second counter is configured to generate a second count value corresponding to counting pulses of the latched compensation signal during a period that the first count value is equal to or less than a predetermined threshold value. The calibration logic circuit is configured to determine whether rising and falling edges of the latched compensation signal from the synchronization circuit and corresponding rising and falling edges of the delayed data signal are synchronized based on the second count value.

In an embodiment, the synchronization circuit may include a first emitter coupled logic (ECL) buffer configured to receive the data signal and output an ECL data signal, a second ECL buffer configured to receive the compensation signal and output an ECL compensation signal, and an ECL latch synchronizer configured to receive the ECL data signal, receive the ECL compensation signal, output an ECL delayed data signal based on the ECL data signal, and output an ECL latched compensation signal by latching the ECL compensation signal based on rising or falling edges of the ECL data signal. The synchronization circuit may also include a first ECL-to-Complementary metal-oxide-semiconductor (ECL-CMOS) converter configured to receive the ECL delayed data signal and output the delayed data signal, and a second ECL-CMOS converter configured to receive the ECL latched compensation signal and output the latched compensation signal.

Aspects of the disclosure provide a method of calibrating signal synchronization of a data storage controller. The method may include receiving a test signal, generating a delayed data signal based on the test signal, and generating a latched compensation signal based on the test signal and a phase shift selected from N predetermined phase shifts. The selected phase shift can be applied by a phase shifter of the data storage controller, and N may be an integer greater than one. The method may further includes determining, by a detection circuit of the data storage controller, whether rising and falling edges of the latched compensation signal are synchronized with corresponding rising and falling edges of the delayed data signal, and setting the phase shifter based on a determination result of whether the rising and falling edges of the latched compensation signal are synchronized with the corresponding rising and falling edges of the delayed data signal.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In accordance with some embodiments of the present disclosure, rising and falling edges of a compensation signal and corresponding rising and falling edges of a data signal can be synchronized by adjusting a phase shift applied to the compensation signal. During a calibration process, a plurality of predetermined phase shifts can be applied to the compensation signal and the corresponding synchronization status can be determined. After the calibration process is completed, a controller that controls the application of the phase shift to the compensation signal may set a proper phase shift based on the determined synchronization status for the plurality of predetermined phase shifts.

Figure 1:
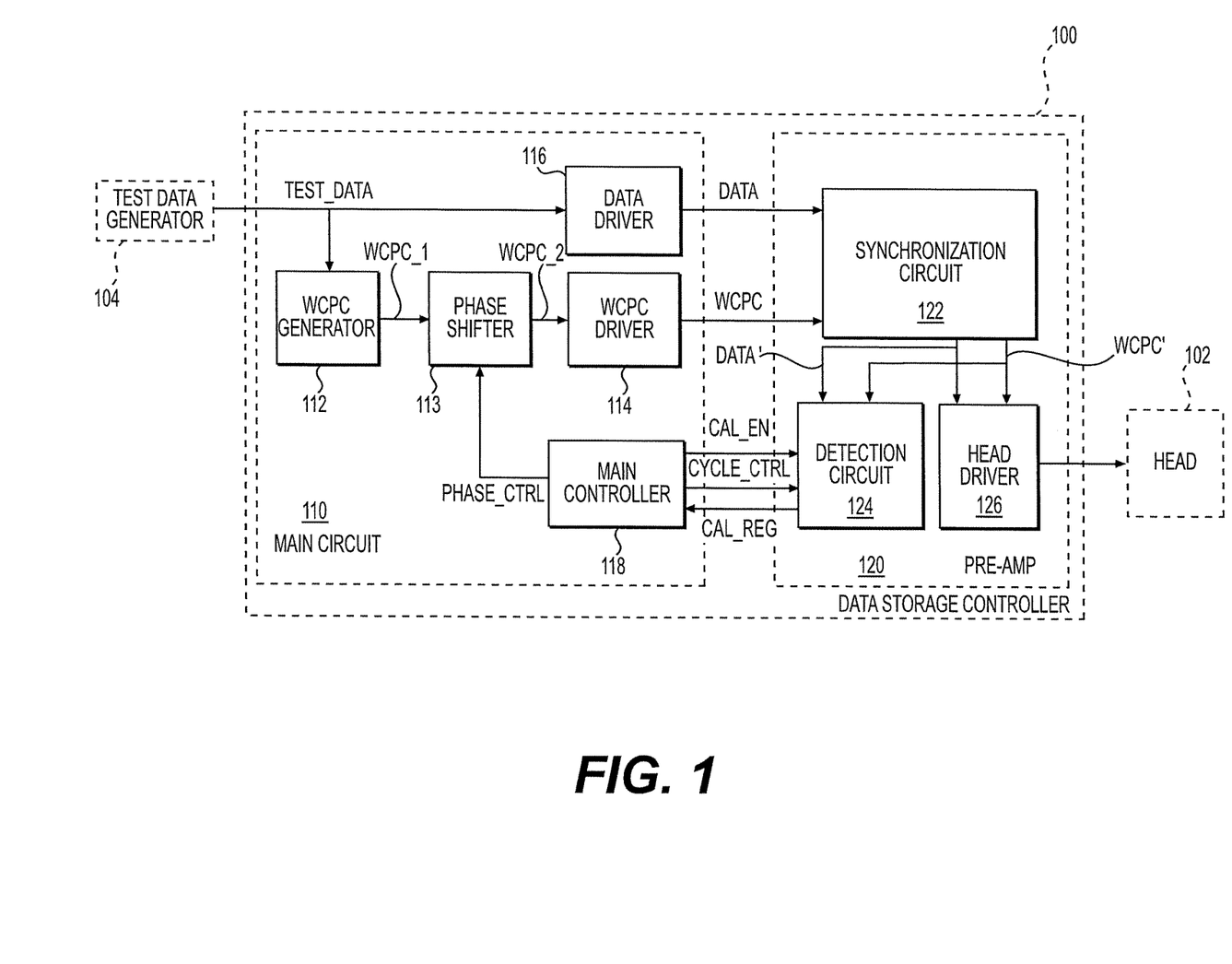
FIG. 1 shows a functional block diagram of a data storage controller according to an embodiment of the disclosure.

FIG. 1 shows a functional block diagram of a data storage controller 100 according to an embodiment of the disclosure. The data storage controller 100 can be configured to control access of a hard drive disc of a hard disc drive. When the data storage controller 100 operates in a normal mode, the data storage controller 100 can control a hard drive read/write head 102 to read data from or write data into the hard drive disc. When the data storage controller 100 operates in a calibration mode, the data storage controller 100 can receive a test data signal (also referred to as a "test signal," TEST_DATA) from a test data generator 104 for performing a calibration process, as described below in greater detail.

The data storage controller 100 includes a main circuit 110 and a pre-amplifier 120. The main circuit 110 can receive the test signal TEST_DATA and generate a data signal DATA based on the test signal TEST_DATA. The main circuit 110 also generates a compensation signal based on the test signal TEST_DATA and a phase shift selected from N predetermined phase shifts, where N is an integer greater than one. The waveform of the test signal TEST_DATA can be varied to represent various logic values. For example, the test signal TEST_DATA can be set at a first voltage level that corresponds to a first logic value (e.g., a logic high level), at a second voltage level that corresponds to a second logic value (e.g., a logic low level), or transitioning between the first and second voltage levels.

The compensation signal can indicate that the test signal TEST_DATA exhibits a predetermined signal pattern. In some examples, the compensation signal is a write current pre-compensation (WCPC) signal that indicates whether the test signal TEST_DATA remains at the logic high level or the logic low level for about a predetermined minimum width T (with acceptable tolerance, such as 2~5% of T), or also referred to as having a 1T high pulse or a 1T low pulse. In the normal mode, based on the compensation signal WCPC, the pre-amplifier 120 may compensate the driving signals accordingly in order to improve the write operation performance when the actual data signal has 1T high pulses or 1T low pulses.

The pre-amplifier 120 includes at least a synchronization circuit 122, a detection circuit 124, and a head driver 126. The synchronization circuit 122 may receive the data signal DATA and the compensation signal WCPC and generates a delayed data signal (DATA') and a latched compensation signal (WCPC') in response to the rising edges, falling edges, and/or the logic values of the data signal DATA. The detection circuit 124 may determine whether the rising and falling edges of the latched compensation signal WCPC' and the corresponding rising and falling edges of the delayed data signal DATA' are synchronized.

During the calibration mode, the main circuit 110 and the pre-amplifier 120 may perform the calibration process, which includes N test cycles corresponding to respectively applying the N predetermined phase shifts to the compensation signal WCPC and determining whether the rising and falling edges of the latched compensation signals WCPC' for the different phase shifts and the corresponding rising and falling edges of the delayed data signal DATA' are synchronized. The main circuit 110 can generate a respective compensation signal WCPC by applying one of the N predetermined phase shifts for a particular test cycle. The synchronization circuit 122 can generate a respective latched compensation signals WCPC' for the test cycle. The detection circuit 124 can determine whether the rising and falling edges of the respective latched compensation signal WCPC' from the synchronization circuit and the corresponding rising and falling edges of the delayed data signal DATA' are synchronized for the test cycle. In some examples, the detection circuit 124 further includes a storage device, such as a shift register, that records the determination results of the N test cycles throughout the calibration process.

After the calibration process is completed, during the normal mode, the main circuit 110 may select one of the N predetermined phase shifts based on the determination results of the calibration process from the detection circuit 124. During the normal mode, the head driver 126 may drive the head 102 to perform a write operation based on the delayed data signal DATA' and the latched compensation signal WCPC' to which the selected one of the N predetermined phase shifts has been applied.

The main circuit 110 includes a WCPC generator 112, a phase shifter 113, a WCPC driver 114, a data driver 116, and a main controller 118. The WCPC generator 112 can generate a raw compensation signal WCPC_1 based on the test signal TEST_DATA. The phase shifter 113 can generate a phase-shifted raw compensation signal WCPC_2 by phase-shifting the raw compensation signal WCPC_1 in response to a phase shift control signal PHASE_CTRL from the main controller 118. The WCPC driver 114 can output the compensating signal WCPC based on the phase-shifted raw compensation signal WCPC_2. Also, the data driver 116 can output the data signal DATA based on the test signal TEST_DATA.

In some examples, the waveform of the raw compensation signal WCPC_1 may be at the logic high level, the logic low level, transitioning between the logic high level and the logic low level. When a pulse width of the test signal TEST_DATA remains at the logic high level or the logic low level is about the predetermined minimum width T, the raw compensation signal WCPC_1 can be set to the logic high level for the same predetermined minimum width T; otherwise, the raw compensation signal WCPC_1 can be set to the logic low level. Therefore, the raw compensation signal WCPC_1 may be use to indicate when the test signal TEST_DATA has 1T high pulses or 1T low pulses.

The main controller 118 can output a calibration enable control signal CAL_EN to the detection circuit 124, where the calibration enable control signal CAL_EN indicates whether the data storage controller 100 is in the calibration mode or in the normal mode. The main controller 118 can output the phase shift control signal PHASE_CTRL to the phase shifter 113 in order to instruct the phase shifter 113 with respect to which one of the N predetermined phase shifts to apply for a particular test cycle. Also, the main controller 118 can output a cycle control signal CYCLE_CTRL to the detection circuit 124 that indicates a beginning and an ending of each test cycle corresponding to the selected phase shift. In addition, the main controller 118 can retrieve determination results CAL_REG from the detection circuit 124 that include the determination results for all the test cycles performed during the calibration process defined by the calibration enable control signal CAL_EN. The main controller 118 may select one of the N predetermined phase shifts to be used during the normal mode based on the retrieved determination results CAL_REG.

The calibration enable control signal CAL_EN, the cycle control signal CYCLE_CTRL, and/or the determination results CAL_REG may be implemented by reusing the signal lines that corresponding to the signals used during the normal mode but not used during the calibration mode. For example, the cycle control signal CYCLE_CTRL may reuse the signal line that carries a read/write mode signal that indicates whether to read from or to write into the storage medium controller by the data storage controller 100 during the normal mode.

In some examples, the N predetermined phase shifts may be represented by time shifts such that the $n^{th}$ phase shift $\Delta\theta_n$ of the N predetermined phase shifts can be determined based on the following:

$$\Delta\theta_n = -T + 2T \cdot \left(\frac{n-1}{N}\right).$$

For example, if N is set to 16, the 16 different phase shifts may be $$-T, -\frac{7}{8}T, -\frac{6}{8}T, -\frac{5}{8}T, -\frac{4}{8}T, -\frac{3}{8}T, -\frac{2}{8}T,$$
$$-\frac{1}{8}T, 0, \frac{1}{8}T, \frac{2}{8}T, \frac{3}{8}T, \frac{4}{8}T, \frac{5}{8}T, \frac{6}{8}T, \text{ and } \frac{7}{8}T.$$

The main controller 118 may control the detection circuit 124 to perform 16 test cycles of the synchronization detections corresponding to the 16 phase shifts during a calibration process. Of course, the N predetermined phase shifts may be decided based on a different number N and/or other approaches.

The N predetermined phase shifts may correspond to different increments of phase shifts. The N determination results CAL_REG retrieved from detection circuit 124 may include synchronized results that correspond to a range of phase shifts of the N predetermined phase shifts. For example, the determination results CAL_REG may have a data pattern in binary format:

0001 1111 1100 0000.

The example determination results CAL_REG may corresponds to having synchronized results when applying phase shifts:

$$-\frac{5}{8}T, -\frac{4}{8}T, -\frac{3}{8}T, -\frac{2}{8}T, -\frac{1}{8}T, 0, \text{ and } \frac{1}{8}T.$$

The main controller 118 may instruct the phase shifter 113 to use a middle one of the range of phase shifts of the N predetermined phase shifts, such as $$-\frac{2}{8}T$$

in this example, during the normal mode.

In some examples, the main circuit 110 may be implanted as a single integrated circuit chip or a combination of plural chips. The main circuit 110 may be part of a chip that is a System on Chip (SoC). The test data generator 104 and the main circuit 110 may be implemented on the same or different chips. Also, in some examples, the main circuit 110 and the pre-amplifier 120 may be implemented on the same or different chips.

Figure 2:
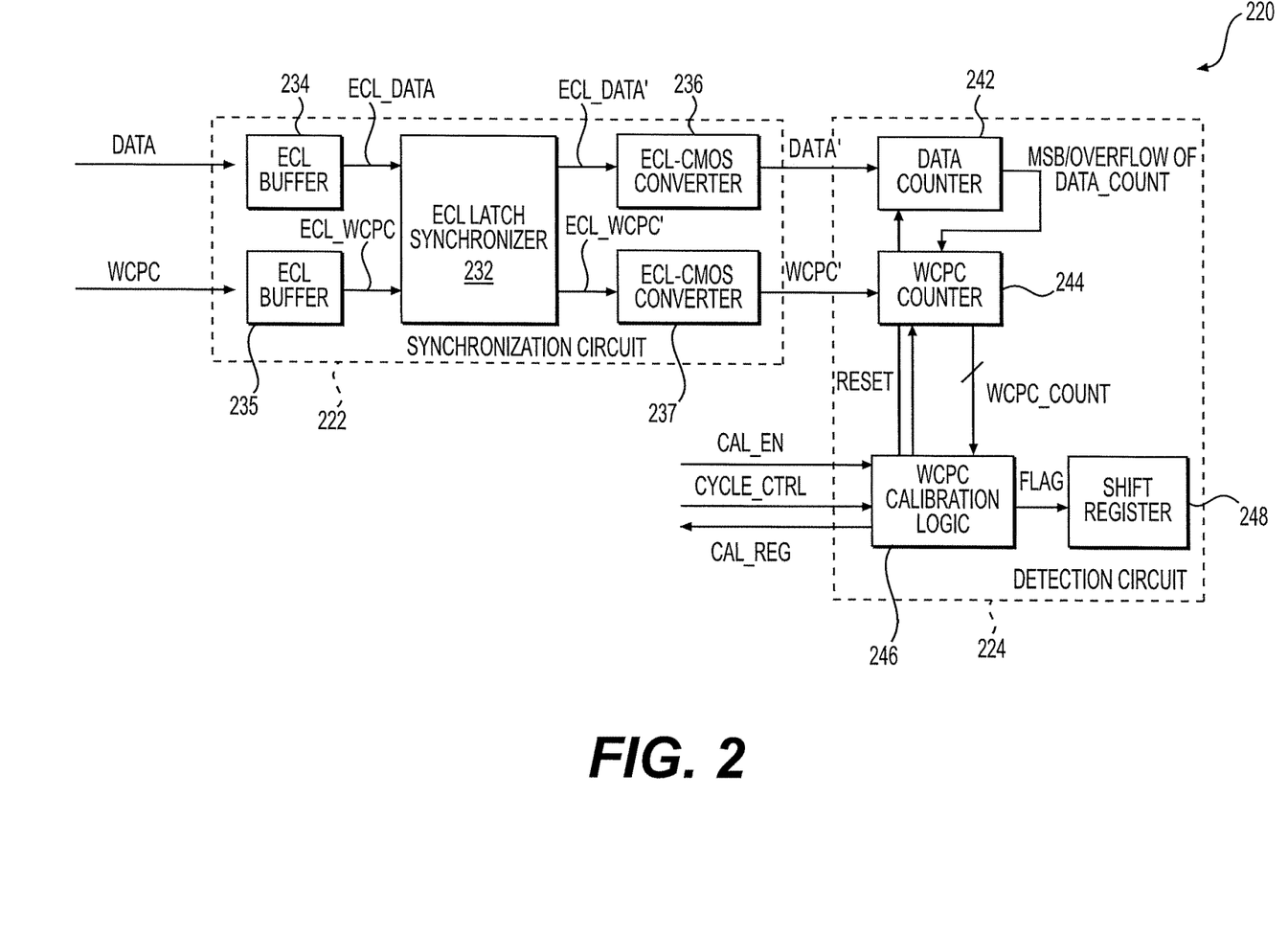
FIG. 2 shows a functional block diagram of a synchronization circuit and a detection circuit of the data storage controller in FIG. 1 according to an embodiment of the disclosure.

FIG. 2 shows a functional block diagram of a synchronization circuit 222 and a detection circuit 224 of a pre-amplifier 220 in a data storage controller, such as the data storage controller 100 in FIG. 1, in a according to an embodiment of the disclosure.

The synchronization circuit 222 includes an emitter-coupled logic (ECL) latch synchronizer 232, which is a high speed latching circuit that is capable of more precisely latching a compensation signal WCPC (e.g., the compensation signal WCPC in FIG. 1) as triggered by rising or falling edges of a data signal DATA (e.g., the data signal DATA in FIG. 1). Also, in this example, the other components outside the synchronization circuit 222 may use Complementary Metal-Oxide-Semiconductor (CMOS) or the like other than the ECL components, and the synchronization circuit 222 further includes a first ECL buffer 234, a second ECL buffer 235, a first ECL-CMOS converter 236, and a second ECL-CMOS converter 237 to convert signals in and out of the synchronization circuit 222. In some examples, the high speed latching circuit may be implemented based on a high speed logic circuit other than the ECL.

In operation, the first ECL buffer 234 receives the data signal DATA and outputs an ECL data signal ECL_DATA that has a waveform similar to that of the data signal DATA, with a delay caused by the first ECL buffer 232. Also, the second ECL buffer 235 receives the compensation signal WCPC and output an ECL compensation signal ECL_W-CPC that has a waveform similar to that of the compensation signal WCPC, with a delay caused by the second ECL buffer 235. The ECL latch synchronizer 232 can output a latched ECL compensation signal ECL_WCPC' that is triggered by rising or falling edges of the ECL data signal ECL_DATA with reference to a logic level of the ECL compensation signal ECL_WCPC. The ECL latch synchronizer 232 can also output a delayed ECL data signal ECL_DATA', which is a delayed version of the ECL data signal ECL_DATA as a result of passing through the ECL latch synchronizer 232 or being a re-generated signal triggered by the rising and falling edges of the ECL data signal ECL_DATA with reference to a logic level of the ECL data signal ECL_DATA.

Also, the first ECL-CMOS converter 236 can receive the ECL delayed data signal ECL_DATA' and output the delayed data signal DATA' that has a waveform similar to that of the ECL delayed data signal ECL_DATA', with a delay caused by the first ECL-CMOS converter 236. The second ECL-CMOS converter 237 can receive the latched ECL compensation signal ECL_WCPC' and output the latched compensation signal WCPC' that has a waveform similar to that of the latched ECL compensation signal ECL_WCPC', with a delay caused by the second ECL-CMOS converter 237.

The detection circuit 224 may include a data counter 424, a WCPC counter 244, a WCPC calibration logic circuit 246, and a shift register 248. The data counter 424 can generate a data count value DATA_COUNT that corresponds to counting pulses of the delayed data signal DATA'. The WCPC counter 244 can generate a WCPC count value WCPC_COUNT that corresponds to counting pulses of the latched compensation signal WCPC' during a period determined based on the data count value DATA_COUNT. In some examples, the WCPC counter 244 can count the pulses of the latched compensation signal WCPC' during a period that the data count value DATA_COUNT is equal to or less than a predetermined threshold value K. In some examples, only a most significant bit (MSB) signal of the data count value DATA_COUNT that corresponds to the predetermined value K is transmitted to the WCPC counter 244 as an enable signal for the WCPC counter 244. In some examples, an overflow signal of the data count value DATA_COUNT that corresponds to the predetermined value K may be transmitted to the WCPC counter 244 as the enable signal for the WCPC counter 244. In some examples, the predetermined threshold value K may be set to 32, 64, or 128. Moreover, the data counter 424 and the WCPC counter 244 may be reset by reset signals (RESET) from the WCPC calibration logic 246.

The calibration logic circuit 246 can receive a calibration enable control signal CAL_EN and a cycle control signal CYCLE_CTRL from a main circuit, such as the main circuit 110 in FIG. 1. The calibration logic circuit 246 can store determination results in the shift register 248 and output determination results CAL_REG from the shift register 248 to the main circuit. Moreover, the calibration logic circuit 246 can receive the WCPC count value WCPC COUNT from the WCPC counter 244 and determine whether the rising and falling edges of the latched compensation signal WCPC' for the selected phase shift of a test cycle is synchronized with the corresponding rising and falling edges of the delayed data signal DATA'. The determination result for each cycle can be indicated by a flag signal FLAG. The shift register 248 can collect and stored the value of the flag signal FLAG for each test cycle and can output the determination results CAL_REG corresponding to determining whether the rising and falling edges of the N latched compensation signals WCPC' for the N predetermined phase shifts and the corresponding rising and falling edges of the delayed data signal DATA' are synchronized.

In operation, the calibration logic circuit 246 start to perform a calibration process as instructed by the calibration enable control signal CAL_EN. The calibration process may include N test cycles, and the beginning and ending of each test cycle may be indicated by the cycle control signal CYCLE_CTRL. In some examples, in response to the beginning of a test cycle, the calibration logic circuit 246 can reset the data counter 242 and the WCPC counter 244 by corresponding reset signals RESET and lift the reset signals RESET to activate the data counter 242 and the WCPC counter 244.

After the RESET signals are lifted, the data counter 242 may start to count the pulses of the delayed data signal DATA'. A MSB of the data count value DATA_COUNT or an overflow signal may indicate whether the data count value DATA_COUNT reaches a predetermined value K and may be used as an enable signal for the WCPC counter 244. Therefore, when the data counter 242 starts to count the pulses of the delayed data signal DATA' but not yet reaches the predetermined value K, the MSB of the data count value DATA_COUNT or an overflow signal may cause the WCPC counter 244 to count the pulses of the latched compensation signals WCPC'. Once the data count value DATA_COUNT reaches the predetermined value K, the WCPC counter 244 may stop counting, and the WCPC count value WCPC_COUNT may remain unchanged afterward.

Next, the WCPC calibration logic circuit 246 can determine whether the WCPC count value WCPC_COUNT equals the predetermined value K as indicated by a flag signal FLAG. After both the data counter 242 and the WCPC counter 244 stop, having the WCPC count value WCPC_COUNT equals the predetermined value K may correspond to a determination that the rising and falling edges of the latched compensation signals WCPC' and the corresponding rising and falling edges of the delayed data signal DATA' are synchronized. When the cycle control signal CYCLE_CTRL indicates the ending of the test cycle, the shift register 248 can record the determination result as indicated by the flag signal FLAG.

After the calibration process is performed, the main controller, such as the main controller 118 in FIG. 1, may retrieve the determination results CAL_REG stored in the shift register 248 and determined which phase shift to use during the normal mode.

Figure 3:
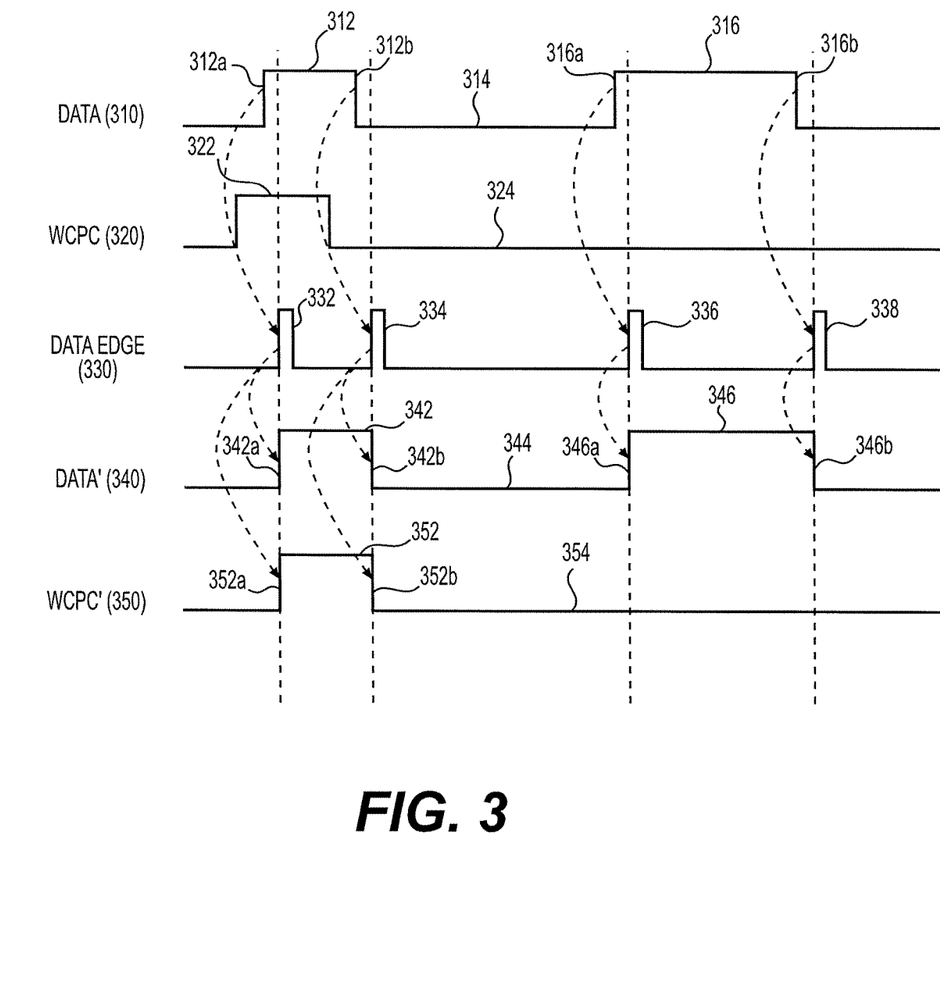
FIG. 3 shows a timing diagram of signals at various nodes of the synchronization circuit in FIG. 2 according to an embodiment of the disclosure.

FIG. 3 shows a timing diagram of signals at various nodes of a synchronization circuit, such as the synchronization circuit 222 in FIG. 2, according to an embodiment of the disclosure. Waveform 310 corresponds to the data signal DATA; waveform 320 corresponds to the compensation signal WCPC; waveform 340 corresponds to the delayed data signal DATA'; and waveform 350 corresponds to the latched compensation signal WCPC'. Also, waveform 330 corresponds to a data edge signal, which includes pulses generated in response to rising or falling edges of the data signal DATA. Also, in FIG. 3, the compensation signal WCPC has been phase-shifted such that the rising and falling edges of the latched compensation signal WCPC' can be synchronized with corresponding rising and falling edges of the delayed data signal DATA'.

As shown in FIG. 3, the waveform 310 of the data signal DATA includes at least a portion 312 that is at a logic high level for about a predetermined minimum width T, a portion 314 that is at a logic low level for a time period greater than the predetermined minimum width T, and a portion 316 that is at the logic high level for another time period greater than the predetermined minimum width T. The portion 312 of the waveform 310 of the data signal DATA also includes a rising edge 312a, a first falling edge 312b, a second rising edge 316a, and a second falling edge 316b. The waveform 320 of the compensation signal WCPC includes at least a portion 322 that is at the logic high level for about the predetermined minimum width T and a portion 324 that is at the logic low level for a time period greater than the predetermined minimum width T. The portion 322 of the compensation signal WCPC is generated in response to the portion 312 (i.e., a 1T high pulse) of the data signal DATA.

In some example, after receiving the data signal DATA and converting the data signal DATA to the ECL data signal ECL_DATA, the ECL latch synchronizer 232 may generate the data edge signal, which includes pulses 332, 334, 336, and 338 that correspond to rising or falling edges 312a, 312b, 316a, and 316b, respectively. The ECL latch synchronizer 232 and the ECL-COMS converter 236 can generate the delayed data signal DATA' by latching the ECL data signal ECL_DATA as triggered by the pulses 332, 334, 336, and 338. As such, the waveform 340 of the delayed data signal DATA' may include portion 342 that corresponds to the portion 312 of the data signal DATA; portion 344 that corresponds to the portion 314 of the data signal DATA; and portion 346 that corresponds to the portion 316 of the data signal DATA. The waveform 340 of the delayed data signal DATA' may include rising or falling edges 342a, 342b, 346a, and 346b that correspond to the rising or falling edges 312a, 312b, 316a, and 316b, respectively.

Also, after receiving the compensation signal WCPC and converting the compensation signal WCPC to the ECL compensation signal WCPC ECL_WCPC, the ECL latch synchronizer 232 and the ECL-COMS converter 237 can generate the latched compensation signal WCPC' by latching the ECL compensation signal ECL_WCPC as triggered by the pulses 332, 334, 336, and 338. As such, the waveform 350 of the latched compensation signal WCPC' may include portion 352 that corresponds to the portion 322 of the compensation signal WCPC; and portion 354 that corresponds to the portion 324 of the compensation signal WCPC. The waveform 350 of the latched compensation signal WCPC' may include a rising edge 352a that is synchronized with the rising edge 342a and a falling edge 352b that is synchronized with the rising edge 342b, when the phase shift of the compensation signal WCPC has been adjusted to allow proper latching thereof as triggered by pulses 332 and 334.

Figure 4:
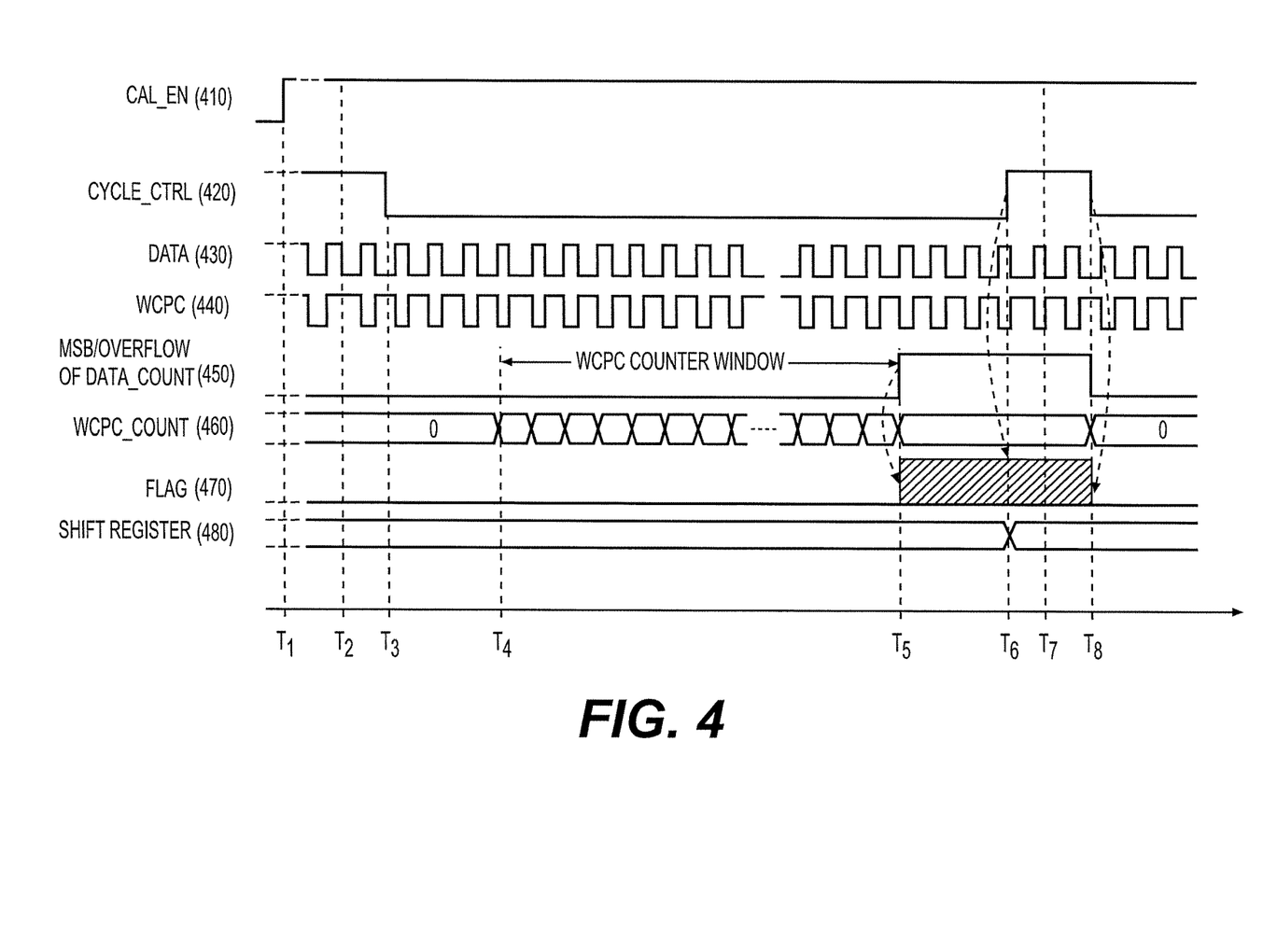
FIG. 4 shows a timing diagram of signals at various nodes of the detection circuit in FIG. 2 when performing a calibration process based on a data signal and a compensation signal according to an embodiment of the disclosure.

FIG. 4 shows a timing diagram of signals at various nodes of a detection circuit, such as the detection circuit 224 in FIG. 2, when performing a calibration process based on a data signal DATA and a compensation signal WCPC according to an embodiment of the disclosure. Waveform 410 corresponds to the calibration enable control signal CAL_EN; waveform 420 corresponds to the cycle control signal CYCLE_CTRL; waveform 430 corresponds to the data signal DATA; and waveform 440 corresponds to the compensation signal WCPC. Also, waveform 450 corresponds to the MSB or overflow signal of the data count value DATA_COUNT; waveform 460 corresponds to the WCPC count value WCPC_COUNT; waveform 470 corresponds to the flag signal FLAG; and waveform 480 corresponds to the determination results stored in the shift register 248.

As shown in FIG. 4, the data signal DATA may include 1T high pulses, and the compensation signal WCPC may similarly include 1T high pulses correspond to the 1T high pulses of the data signal DATA.

At time $T_1$, the calibration enable control signal CAL_EN transitions from a logic low level to a logic high level indicating that the data storage controller is set to a calibration mode for performing a calibration process. In some examples, the calibration process may include N test cycles for determining how N different predetermined phase shifts applied on the compensation signal WCPC would affect the synchronization status between the resulting latched compensation signal WCPC' and the delayed data signal DATA'. At time $T_2$, the main circuit applies a selected one of the N predetermined phase shifts to the compensation signal WCPC.

At time $T_3$, the cycle control signal CYCLE_CTRL transitions from the logic high level to the logic low level that indicates the beginning of a test cycle. At time $T_4$, the WCPC calibration logic circuit 246 lifts the reset signals of the data counter 242 and the WCPC counter 244. Therefore, the data counter 242 may start to count the pulses of the delayed data signal DATA', and the WCPC counter 244 may start to count the latched compensation signal WCPC'.

At time $T_5$, the data count number DATA_COUNT of the data counter 242 reaches a predetermined value K. As a result, the MSB or the overflow signal of the data count number DATA_COUNT transitions from the logic low level to the logic high level, which in turn disables the WCPC counter 244. As shown in FIG. 4, a WCPC counter window thus may be defined as from time $T_4$ to time $T_5$. The WCPC calibration logic circuit 246 may output the flag signal FLAG indicating whether the WCPC count number WCPC_COUNT equals the predetermined value K. In some examples, the flag signal FLAG is at the logic low level when the WCPC count number WCPC_COUNT differs from the predetermined value K; and the flag signal FLAG is at the logic high level the WCPC count number WCPC_COUNT equals the predetermined value K.

At time $T_6$, the cycle control signal CYCLE_CTRL transitions from the logic low level to the logic high level that indicates the ending of the test cycle. In response to the logic high level of the cycle control signal CYCLE_CTRL, the shift register 248 may record the logic level of the flag signal FLAG.

Furthermore, at time $T_7$, the main circuit applies next one of the N predetermined phase shifts to the compensation signal WCPC. At time $T_8$, the cycle control signal CYCLE_CTRL transitions from the logic high level to the logic low level again to indicate the beginning of a next test cycle. In response to the beginning of the next test cycle, the calibration logic circuit 246 can again reset the data counter 242 and the WCPC counter 244 and reset the flag signal FLAG to the logic low level.

The calibration process may be ended when the calibration enable control signal CAL_EN transitions from the logic high level to the logic low level. In some examples, a complete calibration process includes N test cycles for testing all the N predetermined phase shifts.

Figure 5:
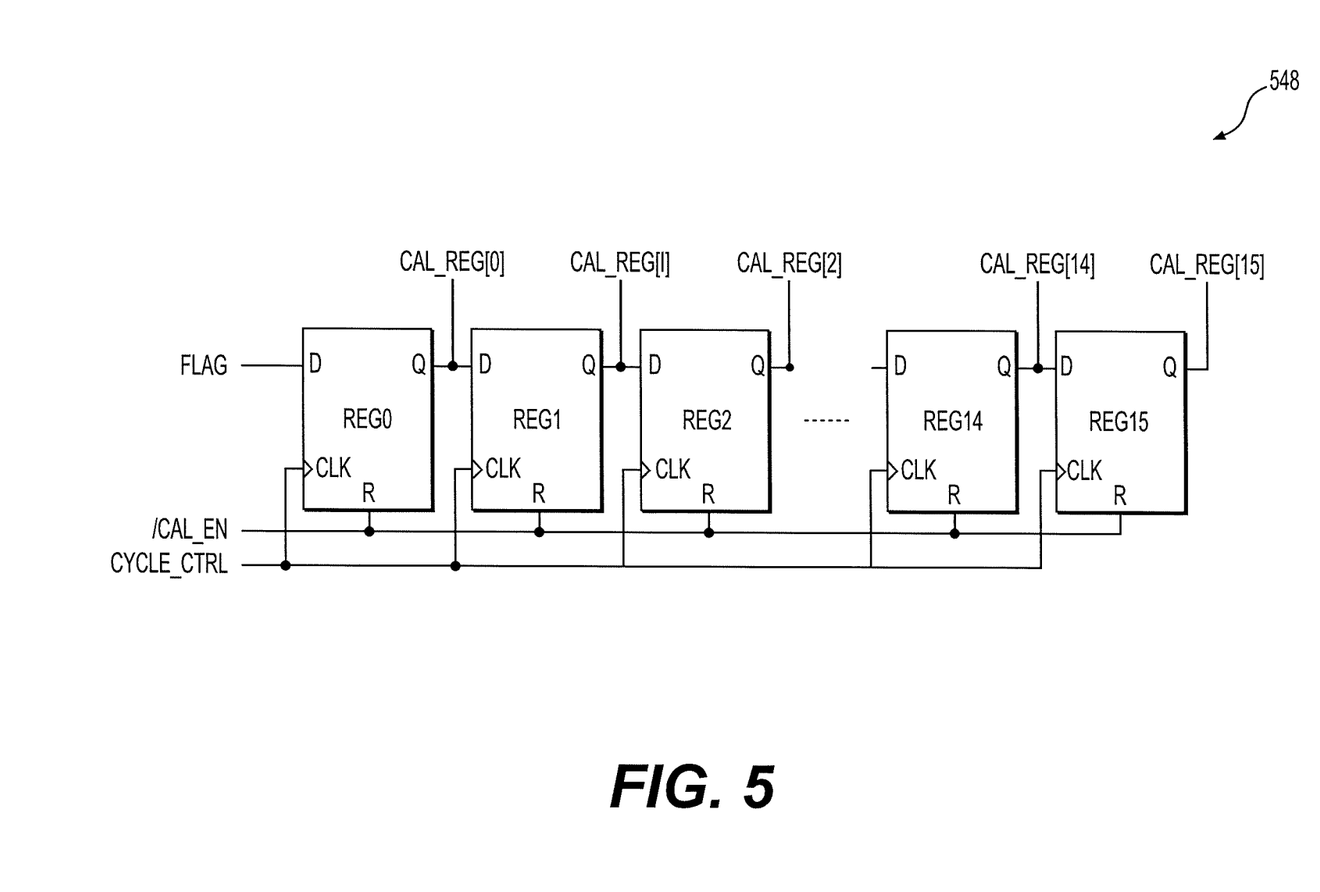
FIG. 5 shows a functional block diagram of the shift register in FIG. 2 according to an embodiment of the disclosure.

FIG. 5 shows a functional block diagram of a shift register 548, such as the shift register 248 in FIG. 2, according to an embodiment of the disclosure. The shift register 548 may be a serial-in-parallel-out shift register prepared for a calibration process that includes N=16 test cycles. The shift register 548 thus may include 16 D-type flip-flops REG0 to REG15 connected in series. The D terminal of the flip-flop REG0 can receive the flag signal FLAG. Also, the D terminal of each one of the flip-flops REG1 to REG15 can receive the output signal from the Q terminal of a previous stage of the flip-flops REG0 to REG14, respectively. The Q terminals of the flip-flops REG0 to REG15 can form a parallel output CAL_REG[0:15] that is usable to indicate the determination results of the 16 test cycles of a calibration process. Moreover, the reset terminals of the flip-flops REG0 to REG15 may receive the inverse of the calibration enable control signal/CAL_EN, and the clock terminals of the flip-flops REG0 to REG15 may receive the cycle control signal CYCLE_CTRL.

In operation, when the detection circuit that includes the shift register 548 is in the calibration mode, the inverse of the calibration enable control signal/CAL_EN may be at the logic low level to activate the flip-flops REG0 to REG15. The shift register 548 can clock-in the logic level of the flag signal FLAG at the end of each test cycle as signaled by the cycle control signal CYCLE_CTRL. The detection circuit may access the stored determination results by reading the stored value from the parallel output CAL_REG[0:15].

Figure 6:
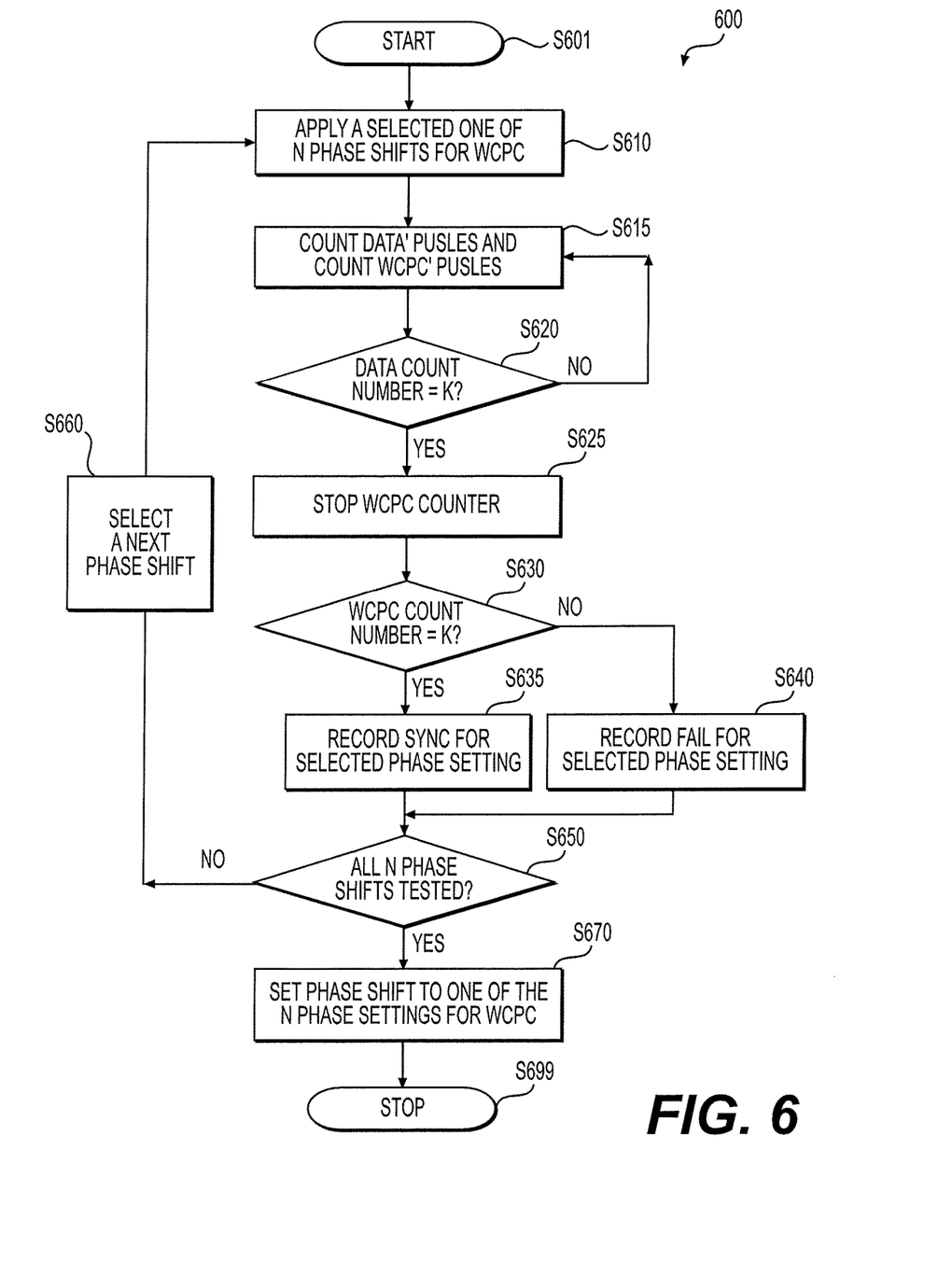
FIG. 6 shows a flow chart outlining a process of calibrating signal synchronization of the data storage controller in FIG. 1 according to an embodiment of the disclosure.

FIG. 6 shows a flow chart outlining a process 600 of calibrating signal synchronization of a data storage controller, such as the data storage controller 100 in FIG. 1, according to an embodiment of the disclosure. It is understood that additional operations may be performed before, during, and/or after the process 600 depicted in FIG. 6. The process 600 starts at S601 and proceeds to S610.

At S610, a selected one of N predetermined phase shifts is applied to a latched compensation signal. For example, the main circuit 110 may receive a test signal TEST_DATA and generate a compensation signal WCPC based on the test signal TEST_DATA and a selected phase shift as described with reference to FIG. 1. In addition, the main circuit 110 may receive the test signal TEST_DATA and generate a data signal DATA based on the test signal TEST_DATA as described with reference to FIG. 1. Moreover, the synchronization circuit 122 or 222 may generate a delayed data signal DATA' and a latched compensation signal WCPC' based on the data signal DATA as described with reference to FIGS. 1-3.

At S615, in order to determine whether the rising and falling edges of the latched compensation signal WCPC' and the corresponding rising and falling edges of the delayed data signal DATA' are synchronized, a data counter is activated to count the pulses of the delayed data signal DATA', and a WCPC counter is activated to count the pulses of the latched compensation signal WCPC'. For example, the counting may be performed by the data counter 242 and the WCPC counter 244, as illustrated with reference to FIGS. 2 and 4.

At S620, it is determined whether a data count number that corresponds to counting the pulses of the delayed data signal DATA' equals a predetermined value K. If data count number equals the predetermined value K, the process proceeds to S625. Otherwise, the process proceeds to S615. At S625, the WCPC counter is stopped. In some example, S620 and S625 may be performed based on a MSB or overflow signal of the data count number of the data counter 242 as an enable signal of the WCPC counter 244 as illustrated with reference to FIG. 2.

At S630, it is determined whether a WCPC count number equals the predetermined value K. If the WCPC count number equals the predetermined value K, the process proceeds to S635 to record the determination results as having synchronized rising or falling edges for the latched compensation signal WCPC' and the delayed data signal DATA'. If the WCPC count number differs from the predetermined value K, the process proceeds to S640 to record the determination results as failing to have synchronized rising or falling edges for the latched compensation signal WCPC' and the delayed data signal DATA'. For example, S630-S640 may be performed by the WCPC calibration logic circuit 246 and the shift register 248 as illustrated with reference to FIGS. 2, 4, and 5.

At S650, it is determined whether all N predetermined phase shifts are tested. If all N predetermined phase shifts are tested, the process proceeds to S670. If there are other phase shifts not yet been tested during the present calibration process, the process proceeds to S660.

At S660, because the calibration process is not yet completed, a next phase shift of the N predetermined phase shifts may be selected, and the process proceeds to S610 to perform a next test cycle.

At S670, the calibration process is completed, and the phase shifter may be set to one of the N predetermined phase shifts after the calibration process based on the determination results of testing the N phase shifts during the calibration process.

After S670, the process proceeds to S699 and terminates.

The circuit or operations based on the logic high levels, logic low levels, rising edges, or falling edges are illustrated as non-limiting examples. A person of ordinary skill in the art would appreciate that any modification of the disclosed embodiments to operate based on different combination of logic high levels, logic low levels, rising edges, or falling edges are within the scope of the present disclosure.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A data storage controller, comprising:
   a main circuit configured to:
      receive a test signal,
      generate a data signal based on the test signal, and
      generate a compensation signal based on the test signal and a phase shift selected from N predetermined phase shifts, wherein N is an integer greater than one;
   a synchronization circuit configured to:
      receive the data signal and the data compensation signal, and
      generate a delayed data signal and a latched compensation signal in response to the data signal; and
   a detection circuit configured to determine whether rising and falling edges of the latched compensation signal and corresponding rising and falling edges of the delayed data signal are synchronized.

2. The data storage controller of claim 1, wherein:
   the main circuit is configured to generate N respective compensation signals for the N predetermined phase shifts, the synchronization circuit is configured to generate N respective latched compensation signals for the N predetermined phase shifts based on the N compensation signals, and the detection circuit is configured to determine whether rising and falling edges of the respective latched compensation signal from the synchronization circuit and corresponding rising and falling edges of the delayed data signal are synchronized for each of the N predetermined phase shifts.

3. The data storage controller of claim 2, wherein:

the N respective compensation signals for the N predetermined phase shifts and the data signal have a predetermined minimum width T, and an $n^{th}$ phase shift $\Delta\theta_n$ of the N predetermined phase shifts is determined based on $$\Delta\theta_n = -T + 2T \cdot \left(\frac{n-1}{N}\right).$$

4. The data storage controller of claim 2, wherein:

the main circuit includes a phase shifter configured to apply the N predetermined phase shifts to the N respective compensation signals; and the main circuit is further configured to:
retrieve N determination results corresponding to determining whether the rising and falling edges of the N respective latched compensation signals for the N predetermined phase shifts and the corresponding rising and falling edges of the delayed data signal are synchronized, and set the phase shifter of the main circuit to apply one of the N predetermined phase shifts based on the N determination results.

5. The data storage controller of claim 4, wherein:

the N predetermined phase shifts correspond to different increments of phase shifts, the N determination results include synchronization results that correspond to a range of phase shifts of the N predetermined phase shifts, and the main circuit is configured to set the phase shifter using a middle one of the range of phase shifts of the N predetermined phase shifts.

6. The data storage controller of claim 1, wherein the detection circuit comprises:

a first counter configured to generate a first count value corresponding to counting pulses of the delayed data signal; and a second counter configured to generate a second count value corresponding to counting pulses of the latched compensation signal during a period that the first count value is equal to or less than a predetermined threshold value.

7. The data storage controller of claim 6, wherein the detection circuit comprises a calibration logic circuit configured to:

receive the second count value from the second counter, determine that the rising and falling edges of the latched compensation signal for the selected phase shift are synchronized with the corresponding rising and falling edges of the delayed data signal when the second count value is equal to the predetermined threshold value; and determine that the rising and falling edges of the latched compensation signal for the selected phase shift are not synchronized with the corresponding rising and falling edges of the delayed data signal when the second count value is not equal to the predetermined threshold value.

8. The data storage controller of claim 6, wherein the detection circuit further comprises a shift register configured to record N determination results corresponding to determining whether the rising and falling edges of the N latched compensation signals for the N predetermined phase shifts and the corresponding rising and falling edges of the delayed data signal are synchronized.

9. The data storage controller of claim 6, wherein the detection circuit is configured to:

receive a test cycle control signal having a first edge indicating a beginning of a test cycle for determining whether the rising and falling edges of the latched compensation signals for the selected phase shift and the corresponding rising and falling edges of the delayed data signal are synchronized, and a second edge indicate an ending of the test cycle, reset the first and second counters in response to the first edge of the test cycle enabling signal, and record a determination result for the selected phase shifts in response to the second edge of the test cycle enabling signal.

10. A data storage controller, comprising:

a synchronization circuit configured to:
receive a data signal,
receive a compensation signal,
generate a delayed data signal, and
generate a latched compensation signal in response to the data signal;

a first counter configured to generate a first count value corresponding to counting pulses of the delayed data signal;

a second counter configured to generate a second count value corresponding to counting pulses of the latched compensation signal during a period that the first count value is equal to or less than a predetermined threshold value; and a calibration logic circuit configured to determine whether rising and falling edges of the latched compensation signal from the synchronization circuit and corresponding rising and falling edges of the delayed data signal are synchronized based on the second count value.

11. The data storage controller of claim 10, wherein the synchronization circuit comprises:

a first emitter coupled logic (ECL) buffer configured to receive the data signal and output an ECL data signal;

a second ECL buffer configured to receive the compensation signal and output an ECL compensation signal;

an ECL latch synchronizer configured to receive the ECL data signal, receive the ECL compensation signal, output an ECL delayed data signal based on the ECL data signal, and output an ECL latched compensation signal by latching the ECL compensation signal based on rising or falling edges of the ECL data signal; and a first ECL-to-Complementary metal-oxide-semiconductor (ECL-CMOS) converter configured to receive the ECL delayed data signal and output the delayed data signal; and a second ECL-CMOS converter configured to receive the ECL latched compensation signal and output the latched compensation signal.

12. The data storage controller of claim 10, wherein:

the first counter is configured to output a most significant bit (MSB) or an overflow signal, and the second counter is configured to use the MSB or overflow signal from the first counter as an enable signal of the second counter.

13. The data storage controller of claim 10, wherein the calibration logic circuit is further configured to:
receive a test cycle control signal having a first edge indicating a beginning of a test cycle for determining whether the rising and falling edges of the latched compensation signals and the corresponding rising and falling edges of the delayed data signal are synchronized, and a second edge indicate an ending of the test cycle,
reset the first and second counters in response to the first edge of the test cycle enabling signal, and
record a determination result in response to the second edge of the test cycle enabling signal.

14. The data storage controller of claim 10, further comprising a shift register configured to record N determination results of N respective test cycles for N predetermined phase shifts of the compensation signal, N being a positive integer greater than one.

15. A method of calibrating signal synchronization of a data storage controller, the method comprising:
receiving a test signal;
generating a delayed data signal based on the test signal;
generating a latched compensation signal based on the test signal and a phase shift selected from N predetermined phase shifts, wherein the selected phase shift is applied by a phase shifter of the data storage controller, and N is an integer greater than one;
determining, by a detection circuit of the data storage controller, whether rising and falling edges of the latched compensation signal are synchronized with corresponding rising and falling edges of the delayed data signal; and
setting the phase shifter based on a determination result of whether the rising and falling edges of the latched compensation signal are synchronized with the corresponding rising and falling edges of the delayed data signal.

16. The method according to claim 15, further comprising:
generating N respective latched compensation signals for the N predetermined phase shifts;
determining whether rising and falling edges of the respective latched compensation signal and corresponding rising and falling edges of the delayed data signal are synchronized for each of the N predetermined phase shifts; and
setting the phase shifter based on N determination results of whether the falling edges of the N respective latched compensation signals and the corresponding rising and falling edges of the delayed data signal are synchronized.

17. The method according to claim 16, wherein:
the N respective compensation signals for the N predetermined phase shifts and the data signal have a predetermined minimum width T, and
an $n^{th}$ phase shift $\Delta\theta_n$ of the N predetermined phase shifts is determined based on $$\Delta\theta_n = -T + 2T \cdot \left(\frac{n-1}{N}\right).$$

18. The method according to claim 16, wherein:
the N predetermined phase shifts correspond to different increments of phase shifts,
the N determination results include synchronization results that correspond to a range of phase shifts of the N predetermined phase shifts, and
setting the phase shifter comprises using a middle one of the range of phase shifts of the N predetermined phase shifts.

19. The method according to claim 15, wherein determining whether the rising and falling edges of the latched compensation signal and the corresponding rising and falling edges of the delayed data signal are synchronized comprises:
generating, by a first counter of the detection circuit, a first count value corresponding to counting pulses of the delayed data signal;
generating, by a second counter of the detection circuit, a second count value corresponding to counting pulses of the latched compensation signal during a period that the first count value is equal to or less than a predetermined threshold value;
determining that the rising and falling edges of the latched compensation signal for the selected phase shift are synchronized with the corresponding rising and falling edges of the delayed data signal when the second count value equals the predetermined threshold value; and
determine that the rising and falling edges of the latched compensation signal for the selected phase shift are not synchronized with the corresponding rising and falling edges of the delayed data signal when the second count value differs from the predetermined threshold value.

20. The method according to claim 19, further comprising:
receiving a cycle control signal having a first edge indicating a beginning of a test cycle for determining whether the rising and falling edges of the latched compensation signals and the corresponding rising and falling edges of the delayed data signal are synchronized for the selected phase shift, and a second edge indicating an ending of the test cycle;
resetting the first and second counters in response to the first edge of the test cycle enabling signal; and
recording a determination result for the selected phase shift in response to the second edge of the test cycle enabling signal.

* * * * *